United States Patent
Hutchins et al.

(10) Patent No.: US 9,199,531 B2
(45) Date of Patent: Dec. 1, 2015

(54) HYBRID ELECTRIC VEHICLE COOLING CIRCUIT AND METHOD OF COOLING

(75) Inventors: Bill Hutchins, Kenilworth (GB); Benedict Wicksteed, Bloxham (GB); Muhammad Fattah, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/004,948

(22) PCT Filed: Mar. 15, 2012

(86) PCT No.: PCT/EP2012/054523
§ 371 (c)(1),
(2), (4) Date: Nov. 19, 2013

(87) PCT Pub. No.: WO2012/123525
PCT Pub. Date: Sep. 20, 2012

(65) Prior Publication Data
US 2015/0107919 A1 Apr. 23, 2015

(30) Foreign Application Priority Data
Mar. 16, 2011 (GB) .................................. 1104381.7

(51) Int. Cl.
*F01P 7/14* (2006.01)
*B60K 11/02* (2006.01)
*B60K 6/48* (2007.10)
*F01P 3/20* (2006.01)
(Continued)

(52) U.S. Cl.
CPC . *B60K 11/02* (2013.01); *B60K 6/48* (2013.01); *B60K 6/485* (2013.01); *F01P 3/20* (2013.01); *B60K 11/04* (2013.01); *B60K 17/34* (2013.01); *B60K 2001/001* (2013.01); *B60K 2001/003* (2013.01); *B60K 2001/006* (2013.01); *F01P 2050/24* (2013.01); *Y02T 10/6221* (2013.01); *Y02T 10/6226* (2013.01); *Y02T 10/6265* (2013.01); *Y10S 903/904* (2013.01)

(58) Field of Classification Search
USPC ............... 180/65.1–65.285; 123/41.01–41.85
See application file for complete search history.

(56) References Cited

U.S. PATENT DOCUMENTS

| 5,251,588 | A | 10/1993 | Tsujii et al. | |
| 8,281,884 | B2 * | 10/2012 | Cimatti et al. | ........... 180/65.275 |
| 2004/0163861 | A1 | 8/2004 | Fukuda et al. | |

FOREIGN PATENT DOCUMENTS

| DE | 10153587 A1 | 5/2002 |
| JP | 11022460 A | 1/1999 |

(Continued)

OTHER PUBLICATIONS

International Search Report for PCT/EP2012/054523 dated Oct. 8, 2012, 3 pages.

(Continued)

*Primary Examiner* — Jeffrey J Restifo
*Assistant Examiner* — Erez Gurari
(74) *Attorney, Agent, or Firm* — Reising Ethington P.C.

(57) ABSTRACT

Embodiments of the invention provide a hybrid electric vehicle comprising an engine and at least one electric machine arranged to be cooled by coolant flowing through a coolant circuit of the vehicle, the engine and at least one electric machine being coupled in series in the circuit, wherein a bypass portion is provided arranged to allow at least a portion of the coolant to bypass the electric machine when the engine is running.

13 Claims, 4 Drawing Sheets

(51) Int. Cl.
  *B60K 6/485* (2007.10)
  *B60K 1/00* (2006.01)
  *B60K 11/04* (2006.01)
  *B60K 17/34* (2006.01)

(56) References Cited

FOREIGN PATENT DOCUMENTS

| JP | H11107749 A | 4/1999 |
| JP | 2004346831 A | 12/2004 |
| JP | 2005113831 A | 4/2005 |
| JP | 2011031672 A | 2/2011 |

OTHER PUBLICATIONS

Great Britain Search Report for corresponding application No. GB1104381.7, Jul. 6, 2011, 6 pages.

English Translation of Japanese Notice of Reason for Refusal for corresponding Japanese Patent Application 2013-558431, dated Oct. 22, 2014, 3 pages.

\* cited by examiner

HYBRID ELECTRIC VEHICLE COOLING CIRCUIT AND METHOD OF COOLING

FIELD OF THE INVENTION

The present invention relates to a cooling circuit for a hybrid electric vehicle (HEV). In particular but not exclusively the invention relates to a cooling circuit for a HEV having an internal combustion engine and at least one electric machine.

BACKGROUND

It is known to provide a cooling circuit for an internal combustion engine in which coolant is circulated between the engine and an external heat exchanger such as a radiator in the conventional manner.

Hybrid electric vehicles (HEVs) have one or more electric machines in addition to the internal combustion engine. The electric machines employed in HEVs typically also require a flow of coolant therethrough in order to prevent overheating. It is known to provide a HEV having a separate cooling circuit for cooling the electric machine.

It is against this background that the present invention has been conceived. Embodiments of the present invention may provide an improved cooling circuit for a HEV. Other aims and advantages of the invention will become apparent from the following description, claims and drawings.

STATEMENT OF THE INVENTION

Embodiments of the invention may be understood by reference to the appended claims.

Aspects of the invention provide a motor vehicle and a method.

In a further aspect of the invention for which protection is sought there is provided a hybrid electric vehicle comprising an engine and at least one electric machine arranged to be cooled by coolant flowing through a coolant circuit of the vehicle, the engine and at least one electric machine being coupled in series in the circuit, wherein a bypass portion is provided arranged to allow at least a portion of the coolant to bypass the electric machine when the engine is running.

Embodiments of the present invention have the advantage that because the engine and at least one electric machine are coupled in series, waste heat from the at least one electric machine may be employed to warm the engine when the vehicle is being driven by means of the at least one electric machine with the engine switched off.

Furthermore, when the engine is switched on excess coolant flow through the engine may bypass the at least one electric machine thereby to avoid restricting fluid flow through the engine.

In an embodiment the vehicle may be operable in a first mode in which the engine develops torque to drive the vehicle and a second mode of operation in which the engine is switched off and the at least one electric machine develops torque to drive the vehicle, the bypass portion being arranged to allow at least a portion of the coolant passing through the engine to bypass the electric machine when the vehicle is in the first mode of operation.

This feature has the advantage that a sufficient flow of coolant may be maintained through the engine when the engine is switched on. It is to be understood that if all of the coolant flowing through the engine is also required to flow through the CIMG the CIMG may be incapable (due for example to its size) of allowing a sufficiently high flow rate of coolant therethrough to cool the engine. Thus the provision of a bypass circuit allows coolant flow to be maintained through the CIMG whilst also allowing a sufficiently high flow rate to satisfy the cooling requirement of the engine.

In an embodiment the vehicle may be operable to allow the engine and the at least one electric machine to run when the vehicle is in the first mode.

Optionally a first fluid pump is provided to pump coolant through the engine and a second fluid pump is provided to pump coolant through the at least one electric machine, the second fluid pump being provided in series with the at least one electric machine and in parallel with the bypass portion.

This feature has the advantage that coolant may be drawn through the at least one electric machine from the engine thereby to reduce an amount of coolant that bypasses the at least one electric machine.

In an embodiment the bypass portion may be operable to allow fluid passing through the engine to bypass the electric machine responsive to a pressure of coolant in the coolant circuit.

Optionally a pressure relief valve (PRV) is provided in the coolant circuit wherein coolant bypassing the electric machine via the bypass portion is required to flow through the PRV.

The PRV may be arranged to allow a flow of coolant from the engine to bypass the electric machine via the bypass portion in dependence on a pressure difference between a coolant inlet and a coolant outlet of the PRV.

The coolant outlet of the PRV may be provided in fluid communication with a coolant outlet of the electric machine.

Further optionally the electric machine is connected in the cooling circuit by means of a pressure relief valve (PRV), the PRV having: a first fluid inlet arranged to receive coolant from a coolant outlet of the engine; a second fluid inlet arranged to receive coolant from a fluid outlet of the at least one electric machine; and a coolant outlet coupled to a coolant inlet of the engine, the PRV being operable to allow a flow of fluid through the electric machine responsive to a pressure difference between the first and second fluid inlets of the PRV.

Optionally the PRV is arranged whereby a flowpath is provided for fluid through the PRV via the second inlet regardless of a pressure of fluid at the first inlet. Thus even under extreme conditions in which a pressure of coolant flowing out from the engine is particularly high, fluid may still flow through the second inlet allowing the electric machine to be cooled.

Optionally the coolant outlet of the PRV is coupled to the coolant inlet of the engine via the first pump.

Further optionally the PRV is operable such that the flow rate of fluid through the electric machine is responsive to the difference in pressure between the first and second fluid inlets.

In an embodiment the second fluid pump may be arranged such that when the second fluid pump is operational the flow rate of coolant through the second inlet of the PRV is increased.

This feature has the advantage that the greater the pressure at the second inlet relative to that at the first inlet the greater the flow rate of fluid through the electric machine.

Thus, in the case that a second fluid pump is provided to pump coolant through the electric machine as described above, the amount of fluid flowing through the bypass portion may be reduced when the second fluid pump is operating since the difference in pressure between the first and second inlets may be reduced.

In an embodiment the second fluid pump may be provided between the first and second fluid inlets of the PRV such that when the second fluid pump is operational and the engine is switched off flow of coolant through the first inlet of the PRV is substantially prevented.

In a further aspect of the invention for which protection is sought there is provided a method of cooling drive means of a hybrid electric vehicle, the drive means comprising an engine and at least one electric machine arranged to be cooled by coolant flowing through a coolant circuit of the vehicle, the engine and at least one electric machine being coupled in series in the circuit, the method comprising allowing at least a portion of the coolant to bypass the electric machine when the engine is running.

In one aspect of the invention for which protection is sought there is provided a hybrid electric vehicle comprising an engine and at least one electric machine arranged to be cooled by coolant flowing through a coolant circuit of the vehicle, the engine and at least one electric machine being coupled in series, wherein a bypass portion is provided operable to allow fluid passing through the engine to bypass the electric machine when the engine is running.

Embodiments of the present invention have the advantage that because the engine and at least one electric machine are coupled in series, waste heat from the at least one electric machine may be employed to warm the engine when the vehicle is being driven by means of the at least one electric machine with the engine switched off.

Furthermore, when the engine is switched on excess coolant flow through the engine may bypass the at least one electric machine thereby to avoid restricting fluid flow through the engine.

In another aspect of the invention for which protection is sought there is provided a hybrid electric vehicle comprising an engine and at least one electric machine arranged to be cooled by coolant flowing through a coolant circuit of the vehicle, the coolant circuit being operable in a first mode or a second mode, in the first mode of operation the engine being connected in the coolant circuit in parallel with the at least one electric machine, in the second mode of operation the engine being connected in the coolant circuit in series with the electric machine.

In a further aspect of the invention for which protection is sought there is provided a method of cooling an engine and at least one electric machine in a hybrid electric vehicle by means of coolant flowing through a coolant circuit of the vehicle, the method comprising: in a first mode of operation connecting the engine and at least one electric machine in the coolant circuit in parallel; and in a second mode of operation connecting the engine and at least one electric machine in the coolant circuit in series.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
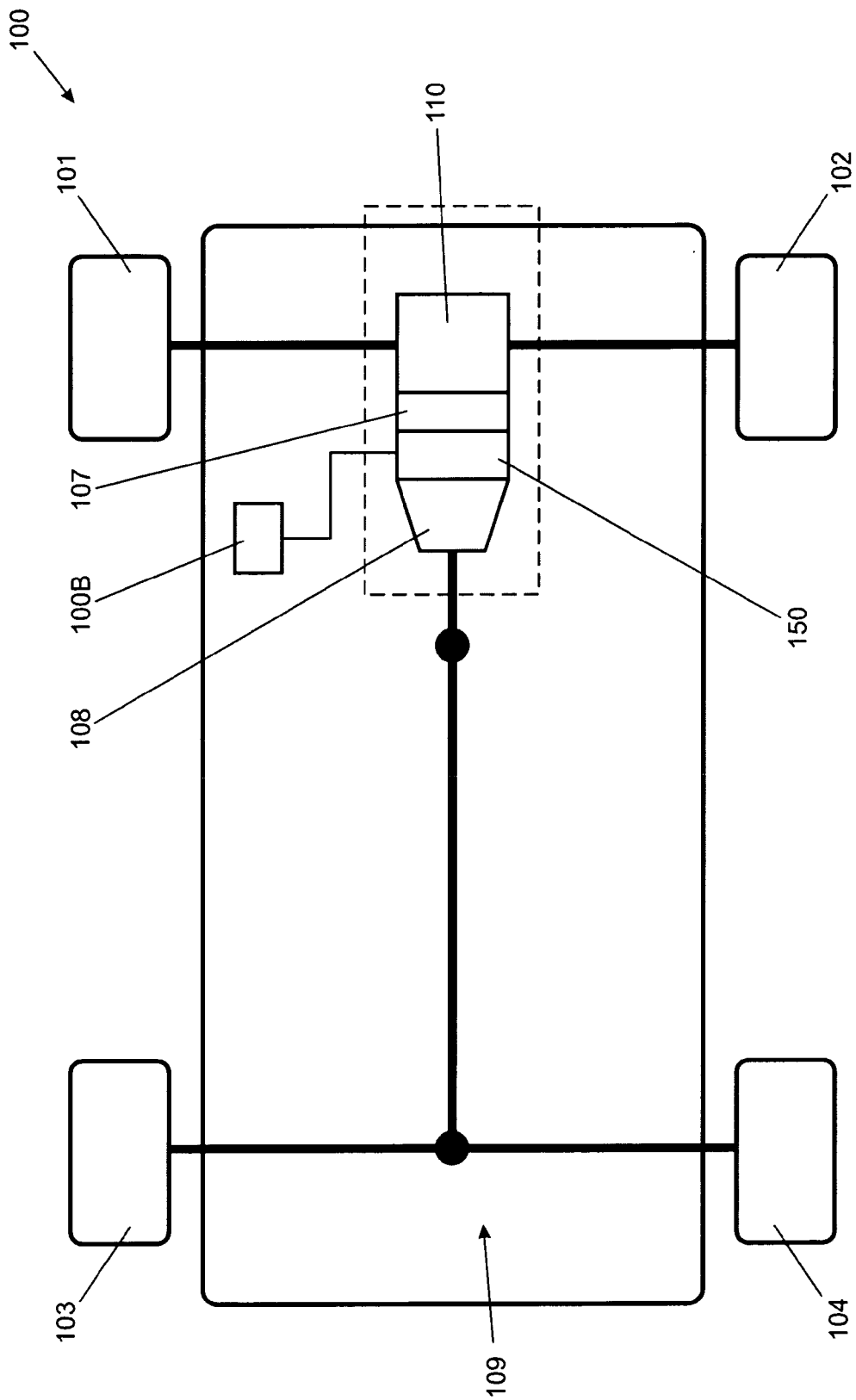
FIG. 1 is a schematic illustration of a hybrid electric vehicle having a cooling circuit according to an embodiment of the present invention.

FIG. 1 shows a hybrid electric vehicle 100 according to an embodiment of the present invention.

The vehicle 100 has an internal combustion engine 110 and an electric machine 150 in the form of a crankshaft integrated motor/generator (CIMG). The engine 110 and CIMG 150 are each operable to provide motive torque to a transmission 108. The transmission 108 is in turn coupled to a pair of front wheels 101, 102 of the vehicle. When required the transmission 108 may also be coupled to a pair of rear wheels 103, 104 of the vehicle 100 by means of an auxiliary driveline 109.

A clutch 107 (also referred to as clutch K0) is provided between the engine 110 and CIMG 150. The clutch 107 may be opened to decouple the engine 110 from the CIMG 150 and transmission 108.

The vehicle 100 may be driven in a first mode (also referred to as a parallel mode) in which the clutch 107 is closed and both the engine 110 and CIMG 150 may provide drive torque to the transmission 108.

The vehicle 100 may also be driven in a second mode (also referred to as an electric vehicle (EV) mode) in which the engine 110 is switched off and only the CIMG 150 can provide drive torque to the transmission 108. In the EV mode the clutch 107 is opened to decouple the engine 110 from the CIMG 150.

In either of the first and second modes the CIMG 150 may also be driven as a generator to recharge a battery 1008 of the vehicle 100.

Figure 2:
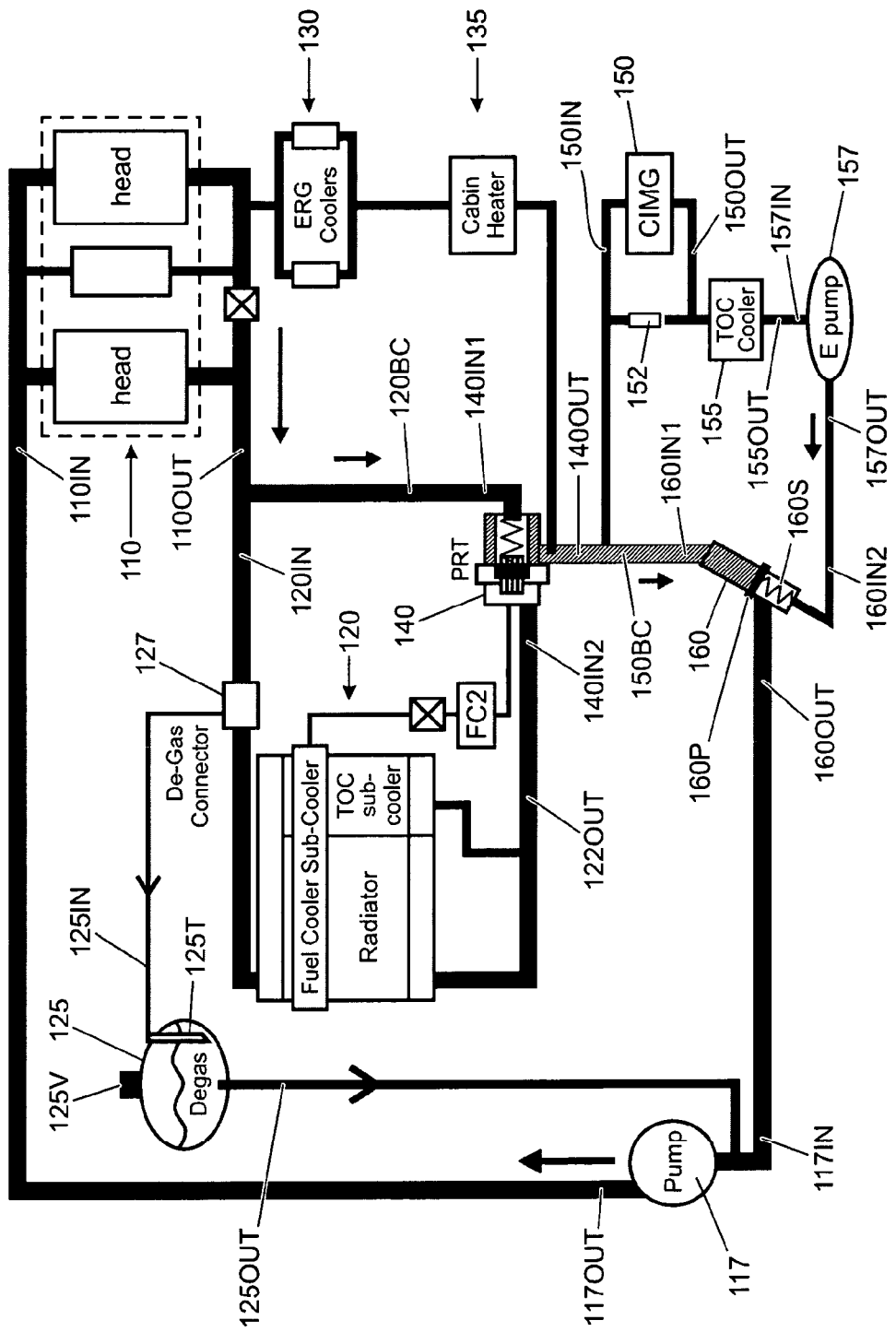
FIG. 2 is a schematic illustration of the cooling circuit of the vehicle of FIG. 1.

FIG. 2 shows a cooling circuit of the vehicle 100 of FIG. 1. It can be seen that the engine 110 is coupled in series with the CIMG 150 in the circuit such that coolant flowing through the engine 110 may also flow through the CIMG 150. This feature has the advantage that when the engine 110 is off, heat generated by the CIMG 150 may be used to warm the engine 110.

This in turn reduces an amount of time required for the engine 110 to warm to an operating temperature at which an amount of undesirable combustion gases emitted by the engine 110 is below a prescribed threshold.

An engine-driven fluid pump 117 is provided for pumping coolant when the vehicle 100 is in the first mode. An inlet 117IN of the pump pumps coolant from the engine 110 and CIMG 150 and an outlet 117OUT of the pump 117 is coupled to an inlet 110IN of the engine 110 thereby to circulate coolant through the engine 110 and CIMG 150 when the engine 110 is on.

It is to be understood that when the engine 110 is off coolant is not prevented by the pump 117 from circulating between the engine 110 and CIMG 150. In some arrangements, when the engine 110 is off coolant may bypass the pump 117.

An outlet 110OUT of the engine 110 is coupled to the CIMG 150 by means of a pressure relief thermostat (PRT) 140. The PRT 140 has a first inlet 140IN1 arranged to receive a flow of fluid directly from the outlet 110OUT of the engine 110 via bypass conduit 120BC and a second inlet 140IN2 arranged to receive a flow of fluid from the outlet 110OUT via a radiator 120. The radiator 120 is arranged to cool coolant flowing therethrough in the conventional manner.

The PRT 140 controls the relative amounts of coolant that flow through the radiator 120 and bypass conduit 120BC responsive to the temperature of the coolant.

At higher coolant temperatures larger amounts of coolant flow through the radiator 120 relative to the bypass conduit 120BC compared with lower temperatures when the engine 110 is first started at ambient temperature.

An exhaust gas recirculation (EGR) cooler arrangement 130 and cabin heater matrix 135 are coupled in series between the outlet 110OUT of the engine 110 and outlet 140OUT of the PRT 140.

An inlet of the CIMG 150 is coupled to the PRT outlet 140OUT. The CIMG 150 is coupled in parallel with a restrictor valve 152, the restrictor valve and CIMG 150 being coupled in series with a transmission oil cooler (TOC) 155 arranged to cool oil of the transmission 108. The presence of the restrictor valve 152 is arranged to ensure that the CIMG 150 and TOC 155 each receive a required flow rate of coolant therethrough.

An electrically powered fluid pump 157 is coupled downstream of the TOC 155 between the TOC 155 and a second inlet 160IN2 of a pressure relief valve (PRV) 160. An outlet 160OUT of the PRV 160 is coupled to an inlet 117IN of the engine-driven fluid pump 117.

Fluid passing through the engine 110 and PRT 140 is able to flow through the CIMG 150 (or restrictor valve 152) and TOC 155 to the PRV 160 via electric fluid pump 157. Alternatively fluid passing through the engine 110 and PRT 140 is able to flow from the PRT 140 directly to the PRV 160 via a bypass conduit 150BC. This feature has the advantage that when the engine 110 is operating at a relatively high speed, requiring relatively large coolant flow rates therethrough, the CIMG 150, restrictor valve 152 and TOC 155 do not prevent the required coolant flow rate from being attained since excess coolant may flow through the bypass conduit 150BC and on to the engine inlet 110IN via engine-driven fluid pump 117.

The PRV 160 is arranged such that the amount of coolant flowing through the bypass conduit 150BC relative to that through the CIMG 150 and restrictor 152 is responsive to a difference in pressure between the first and second inlets 160IN1, 160IN2 thereof.

It is to be understood that fluid at the first and second inlets 160IN1, 160IN2 of the PRV 160 is arranged to apply pressure to opposite respective faces of a spring-loaded piston 160P. The piston is biased by a spring element 160S to a position at which flow of fluid through the first inlet 160IN1 to the outlet 160OUT is substantially prevented but flow of fluid through the second inlet 160IN2 to the outlet 160OUT is allowed.

As the pressure of fluid at the first inlet 160IN1 increases relative to that at the second inlet 160IN2, the pressure at the first inlet 160IN1 overcomes that at the first inlet 160IN1 and the bias of the spring element 160S causing piston 160P to be displaced by increasing amounts from that at which flow through the first inlet 160IN1 is prevented. This allows an increasing rate of flow of coolant through the first inlet 160IN1.

It is to be understood that the PRV 160 is arranged whereby when the piston 160P is displaced by a maximum amount from the position at which flow through the first inlet 160IN1 is prevented, a flowpath is still provided for fluid through the PRV 160 via the second inlet. This flowpath may be referred to as a 'leak path'. In an embodiment this feature ensures that fluid flow through the CIMG 150 may be permitted regardless of a pressure of coolant at the first inlet 160IN1.

In the first (parallel) mode of operation of the vehicle 100 with the engine 110 and CIMG 150 both running, the engine-driven fluid pump 117 develops a relatively large pressure at the first inlet 160IN1 of the PRV 160, the pressure increasing with increasing engine speed (and therefore increasing generation of waste heat by the engine 110).

Consequently when the engine 110 is running a relatively large proportion of the coolant flowing out from the PRT 140 flows through the CIMG bypass conduit 150BC.

In some arrangements the electrically-driven fluid pump 157 is not powered whilst the vehicle is in the parallel mode although in some embodiments the pump 157 remains on when the engine 110 is running.

In the second (EV) mode of operation with the engine 110 off and only the CIMG 150 operating the pressure of coolant at the PRV inlet 160IN1 is relatively low and the piston 160P of the PRV 160 is displaced so as substantially to prevent coolant flowing through the bypass conduit 150BC.

It is to be understood that in the EV mode coolant bypassing the CIMG 150 via conduit 150BC does not contribute to useful cooling of the CIMG 150 and therefore energy used to pump such coolant may be considered to be wasted.

Accordingly, in the arrangement of FIG. 2 the electrically-driven fluid pump 157 is provided at a location between the first and second inlets 160IN1, 160IN2 of the PRV 160 such that when the electrically-driven fluid pump 157 is operating it acts to increase the pressure difference between the first and second inlets 160IN1, 160IN2 thereby to urge the piston 160P to close the first inlet 160IN1.

Thus, the electrically-driven fluid pump acts to bias the PRV 160 to a condition in which fluid is discouraged from flowing through the CIMG bypass conduit 150BC and encouraged to flow through the CIMG 150 or restrictor valve 152.

This feature allows a smaller electrically-driven fluid pump 157 to be employed (or a fluid pump 157 of a given size to be operated at a reduced pumping rate) thereby reducing an amount of electrical power consumed by the pump 157. This has the advantage in turn that a range of the vehicle 100 when in EV mode may be increased.

Thus it is to be understood that embodiments of the present invention allow a HEV 100 to be provided having improved engine temperature management during operation in EV mode since waste heat generated by the CIMG 150 may be used to warm the engine 110. Furthermore, when operating in EV mode a reduced amount of electrical energy is required to sustain flow of coolant through the engine 110 since the CIMG bypass conduit 150BC may be maintained in a substantially closed condition when operating in EV mode.

The arrangement of FIG. 2 has the advantage that because the PRV 160 is a mechanical device, a response of the PRV 160 to fluctuations in coolant pressure is substantially instantaneous. Furthermore, electrically-operated valves and control apparatus are not required in order to control the flow of coolant through the CIMG bypass conduit 150BC.

However in some arrangements, the PRV 160 may be replaced by one or more electrically operable valves, one or more pressure sensors and a controller. The controller may be arranged to control the valves thereby to obtain a flow of fluid substantially as would occur if a PRV 160 were installed.

Thus, the controller may be arranged to control the valves responsive to a pressure of fluid at the outlet 140OUT of the PRT 140 as determined by the pressure sensor and the selected mode of operation of the vehicle 100 (i.e. whether parallel or EV mode).

When the vehicle 100 is in the parallel mode of operation the controller may be arranged to regulate the flow of coolant through the CIMG bypass conduit 150BC according to the engine speed thereby to maintain adequate cooling of the CIMG 150 and at the same time a sufficient flow rate of coolant through the engine 110.

When in the EV mode the controller may be arranged substantially to prevent flow of fluid through the CIMG bypass conduit 150BC.

It is to be understood that in some arrangements the electrically driven fluid pump 157 may be operated when the vehicle 100 is in the parallel mode in addition to the engine-driven fluid pump 117 in order to increase a flow rate of coolant through the CIMG 150.

This feature may be useful in circumstances where the CIMG 110 is generating increased amounts of waste heat, for example when developing relatively large amounts of torque in a torque-assist mode or when acting as an electrical generator.

For example, in some arrangements the CIMG 150 may be arranged to develop relatively large amounts of current during regenerative braking or in circumstances where braking is not required but the battery 100B is required to be charged. The coolant flow rate provided by the engine-driven fluid pump 117 alone may be insufficient to provide adequate cooling of the CIMG 150. Thus the electrically-driven fluid pump 157 may be employed to increase the flow rate of coolant through the CIMG 150.

It is to be further understood that in some arrangements the engine-driven fluid pump 117 could instead be an electrically-driven fluid pump. In some such arrangements the second electrically driven fluid pump 157 may not be required.

In the arrangement of FIG. 2 the inlet 120IN of the radiator 120 has a de-gas connector 127 provided therein arranged to allow a portion of the fluid flowing through the inlet 120IN to be drawn through a de-gasification tank 125. The degasification tank 125 has a gas vent 125V arranged to allow gas entrained in the flow of coolant to be released from the tank 125 to atmosphere.

The tank 125 has an outlet 125OUT coupled to the inlet 117IN of the engine-driven fluid pump 117. The action of the pump 117 is arranged to draw coolant through the de-gasification tank 125.

The de-gasification tank 125 has a dip-tube 125T arranged such that fluid flowing into the tank 125 through the inlet 125IN is introduced into the tank in a lower region of the tank below a normal expected operating level of coolant in the tank.

This feature has the advantage that if a reverse flow of coolant occurs through the tank, i.e. coolant flows into the tank 125 through the outlet 125OUT, gas contained within the de-gasification tank 125 is not forced out of the tank through the inlet 125IN. Rather, in the arrangement shown a reverse flow of coolant into the de-gasification tank 125 would result in a flow of coolant (rather than gas) out from the tank 125 through the inlet 125IN by virtue of the dip-tube 125T.

Figure 3:
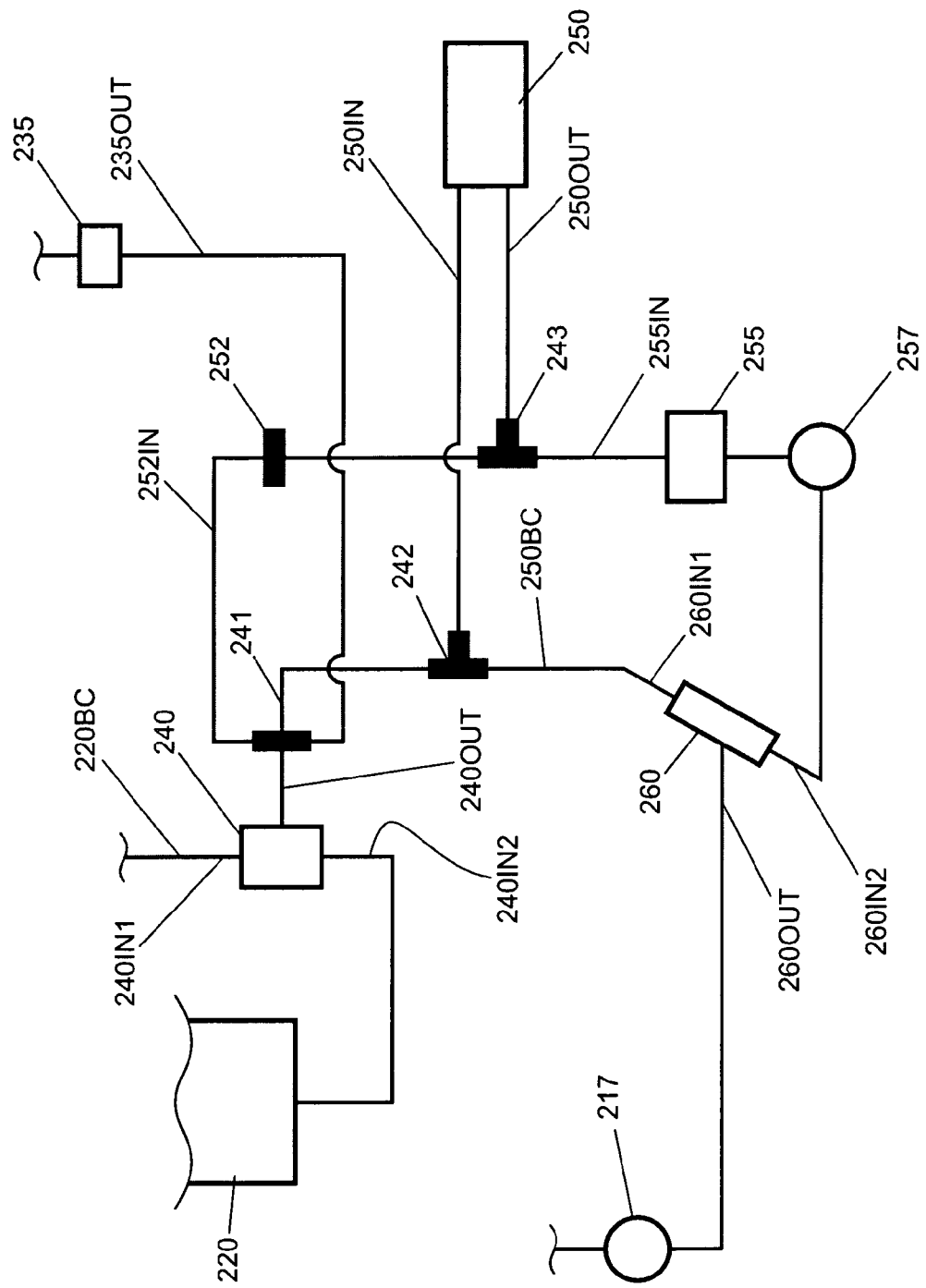
FIG. 3 is a schematic illustration of the cooling circuit of a vehicle according to a further embodiment of the invention.

FIG. 3 shows an arrangement of a portion of a cooling circuit of a vehicle according to an embodiment of the invention similar to the arrangement of FIG. 2 except that a different arrangement of connector components has been employed in the portion shown. The portion not shown is substantially the same as the arrangement of FIG. 2.

Like features of the embodiment of FIG. 3 to that of FIG. 2 are shown with like reference signs prefixed numeral 2 instead of numeral 1.

It is to be understood that an outlet 235OUT of the cabin heater matrix 235 is coupled to an outlet of a PRT 240 by means of a first connector component 241. The connector component 241 has two outlets, one coupled to a CIMG bypass conduit 250BC and the other coupled to an inlet 252IN of a restrictor 252. The restrictor 252 is in turn coupled in series with a transmission oil cooler 255.

An inlet 250IN of the CIMG 250 is coupled to the outlet 240OUT of the PRT 240 by means of a second connector component 242 in the form of a T-connector 242 downstream of the first connector component and upstream of the CIMG bypass conduit 250BC. An outlet 250OUT of the CIMG 250 is coupled to an inlet 255IN of the TOC 255 by means of a third connector component 243 in the form of a T-connector 243.

In some embodiments the cooling circuit of the arrangement of FIG. 3 may be assembled using fewer components than the arrangement of FIG. 2.

Figure 4:
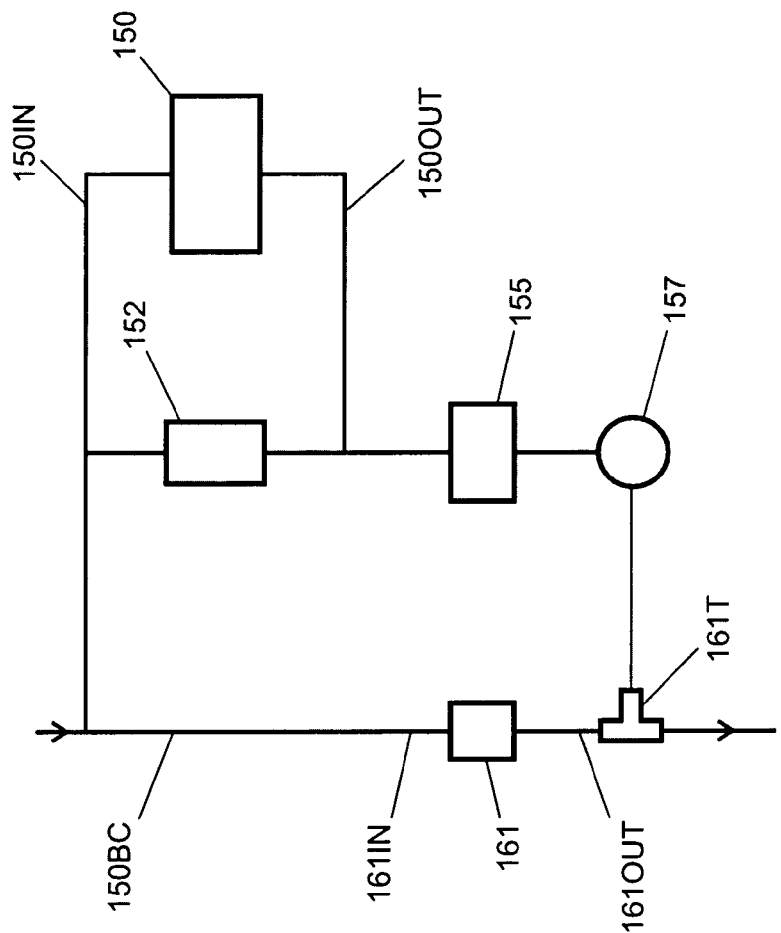
FIG. 4 is a schematic illustration of a portion of the coolant circuit of the embodiment of FIG. 2 with an alternative type of PRV installed therein.

FIG. 4 shows a portion of the coolant circuit of the embodiment of FIG. 2 in which PRV 160 has been replaced by a more conventional PRV design, labelled 161 in FIG. 4. The PRV 161 has a single inlet 161IN and a single outlet 161OUT rather than two inlets and one outlet as per PRV 160. Coolant is able to flow through the PRV 161 from the inlet 161IN to the outlet 161OUT when the pressure at the inlet exceeds that at the outlet by a prescribed amount, in the conventional manner. Coolant is prevented from flowing in the reverse direction through the valve 161 from the outlet 161OUT to the inlet 161IN.

In the embodiment of FIG. 4 an outlet of the electrically driven fluid pump 157 is coupled to a conduit from the PRV 161 to the engine-driven fluid pump 117 by means of a T-connector 161T.

It is to be understood that, in use, fluid flowing out from the coolant outlet 140OUT of the PRT 140 flows through the CIMG 150 or restrictor valve 152 when the PRV 161 is closed. The PRV 161 is arranged to be closed when the engine 110 is switched off. In some embodiments the PRV 161 may also be closed when the engine 110 is running at a relatively low speed.

In some embodiments, when the engine 110 is switched on, the PRV 161 is arranged such that the increase in coolant pressure due to the engine 110 being on is sufficient to cause the PRV 161 to open at least partially. Fluid is therefore able to flow through bypass conduit 150BC.

It is to be understood that when the engine 110 is off (and the engine-driven fluid pump 117 is not pumping fluid), the electrically driven fluid pump 117 is switched on when it is required to cool the CIMG 150. It is to be understood that in some embodiments the electrically driven fluid pump 117 may be switched on whenever it is required to cool the CIMG 150, even when the engine 110 is running. It is to be understood that in some embodiments the presence of the electrically driven fluid pump 117 may be useful in ensuring an adequate flow of coolant though the CIMG 150 and TOC 155 when the engine 110 is on as well as when the engine 110 is off.

Embodiments of the invention have the advantage that an adequate flow rate of coolant may be arranged to flow through the engine 110, CIMG 150 and TOC 155 during operation with the engine 110 on or off and the CIMG 150 on or off. Furthermore, waste heat generated by the CIMG 150 carried by coolant out from the CIMG 150 coolant outlet may be used to warm the engine 110 when the engine 110 is switched off. This feature has the advantage that if (or when) the engine 110 is subsequently restarted, the engine 110 may be at a higher temperature than it might otherwise have been. Thus an amount of undesirable emissions made by the engine 110 may be reduced in some embodiments.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK Patent Application No. GB1104381.7 filed 16 Mar. 2011, the entire contents of which are expressly incorporated by reference herein.

The invention claimed is:

1. A hybrid electric vehicle comprising an engine and at least one electric machine arranged to be cooled by coolant flowing through a coolant circuit of the vehicle, the engine and at least one electric machine being coupled in series in the circuit,
wherein a bypass portion is provided arranged to allow at least a portion of the coolant to bypass the electric machine when the engine is running, and
further wherein the bypass portion is operable to allow fluid passing through the engine to bypass the electric machine responsive to a pressure of coolant in the coolant circuit.

2. A vehicle as claimed in claim 1 wherein the vehicle is operable in a first mode in which the engine develops torque to drive the vehicle and a second mode of operation in which the engine is switched off and the at least one electric machine develops torque to drive the vehicle, the bypass portion being arranged to allow at least a portion of the coolant passing through the engine to bypass the electric machine when the vehicle is in the first mode of operation.

3. A vehicle as claimed in claim 2 operable to allow the engine and the at least one electric machine to run when the vehicle is in the first mode.

4. A vehicle as claimed in claim 1 wherein a first fluid pump is provided to pump coolant through the engine and a second fluid pump is provided to pump coolant through the at least one electric machine, the second fluid pump being provided in series with the at least one electric machine and in parallel with the bypass portion.

5. A vehicle as claimed in claim 1 wherein a pressure relief valve (PRV) is provided in the coolant circuit wherein coolant bypassing the electric machine via the bypass portion is required to flow through the PRV.

6. A vehicle as claimed in claim 5 wherein the PRV is arranged to allow a flow of coolant from the engine to bypass the electric machine via the bypass portion in dependence on a pressure difference between a coolant inlet and a coolant outlet of the PRV.

7. A vehicle as claimed in claim 6 wherein the coolant outlet of the PRV is provided in fluid communication with a coolant outlet of the electric machine.

8. A vehicle as claimed in claim 1 wherein the electric machine is connected in the cooling circuit by means of a pressure relief valve (PRV),
the PRV having:
a first fluid inlet arranged to receive coolant from a coolant outlet of the engine;
a second fluid inlet arranged to receive coolant from a coolant outlet of the at least one electric machine; and
a coolant outlet provided in fluid communication with a coolant inlet of the engine,
the PRV being operable to allow a flow of coolant from the coolant outlet of the engine to bypass the electric machine in dependence on a pressure difference between fluid at the first and second fluid inlets of the PRV respectively.

9. A vehicle as claimed in claim 8 wherein a first fluid pump is provided to pump coolant through the engine and a second fluid pump is provided to pump coolant through the at least one electric machine, the second fluid pump being provided in series with the at least one electric machine and in parallel with the bypass portion, wherein the coolant outlet of the PRV is in fluid communication with the coolant inlet of the engine via the first fluid pump.

10. A vehicle as claimed in claim 8 wherein the PRV is operable such that the flow rate of fluid through the bypass conduit is responsive to the difference in pressure between the first and second fluid inlets thereof.

11. A vehicle as claimed in claim 8 wherein a first fluid pump is provided to pump coolant through the engine and a second fluid pump is provided to pump coolant through the at least one electric machine, the second fluid pump being provided in series with the at least one electric machine and in parallel with the bypass portion, wherein the second fluid pump is arranged such that when the second fluid pump is operational the flow rate of coolant through the second inlet of the PRV is increased.

12. A vehicle as claimed in claim 11 wherein the second fluid pump is provided between the first and second fluid inlets of the PRV such that when the second fluid pump is operational and the engine is switched off flow of coolant through the first inlet of the PRV is substantially prevented.

13. A method of cooling an engine and at least one electric machine of a hybrid electric vehicle, the engine and at least one electric machine arranged to be cooled by coolant flowing through a coolant circuit of the vehicle, the engine and at least one electric machine being coupled in series in the circuit,
the method comprising allowing at least a portion of the coolant to bypass the electric machine when the engine is running, and allowing fluid passing through the engine to bypass the electric machine responsive to a pressure of coolant in the coolant circuit.

* * * * *